Figure 1:
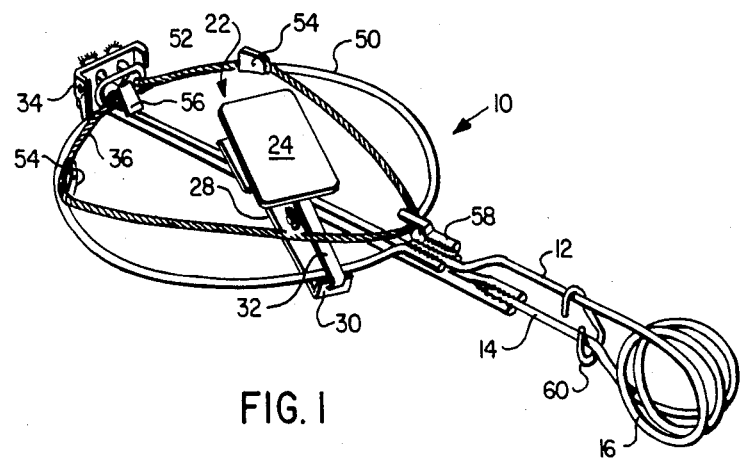

United States Patent [19]
Torkko

[11] Patent Number: 4,581,844
[45] Date of Patent: Apr. 15, 1986

[54] SNARE TYPE HUMANE ANIMAL TRAP
[75] Inventor: Reino Torkko, Long Lac, Canada
[73] Assignee: Canadian Patents and Development Limited, Ottawa, Canada
[21] Appl. No.: 693,883
[22] Filed: Jan. 23, 1985
[51] Int. Cl.⁴ .......................................... A01M 23/34
[52] U.S. Cl. ........................................... 43/87
[58] Field of Search .............................. 43/87, 86, 85

[56] References Cited
U.S. PATENT DOCUMENTS

| | | | |
|---|---|---|---|
| 1,716,959 | 6/1929 | Hendrickson | 43/85 |
| 2,178,256 | 10/1939 | Graybill | 43/87 |
| 2,592,390 | 4/1952 | Burt | 43/87 |
| 3,060,623 | 10/1962 | Aldrich | 43/87 |
| 3,276,159 | 10/1966 | Robards | 43/87 |
| 4,300,305 | 11/1981 | King | 43/85 |

FOREIGN PATENT DOCUMENTS

| | | | |
|---|---|---|---|
| 1112042 | 11/1981 | Canada | 43/86 |
| 397268 | 8/1933 | United Kingdom | 43/87 |

*Primary Examiner*—Gene P. Crosby
*Attorney, Agent, or Firm*—Robert G. Hendry

[57] ABSTRACT

A snare type animal trap which has a pair of arms urged apart by a spring. The upper one of the arms is in the form of a ring. A cable passes through an eyelet on the ring to form a loop which is supported by the ring. The ends of the cable are secured to the end of the lower arm. Trigger means on the lower arm holds the two arms together when the trap is set. Operation of the trigger by an animal causes the ring to fly up, thereby tightening the cable and trapping the animal.

1 Claim, 2 Drawing Figures

SNARE TYPE HUMANE ANIMAL TRAP

This invention relates to animal traps, and more particularly, to snare-type animal traps.

Known snare-type traps are provided with a noose-like cable positioned around the trigger. Spring biased arms are disengaged from each other when the trigger is activated thus causing one of the arms to jerk the noose tight around the leg or the body of the animal.

This type of trap suffers from at least one disadvantage in that the cable may become frozen to the ground or be adversely effected by snow and thus the noose will fail to close properly.

It is therefore an object of the present invention to provide means for lifting the snare to ensure that the snare will close properly regardless of snow or frozen ground conditions.

It is a further object of this invention to provide means for lifting the snare to the height of the leg of the animal to be trapped.

Accordingly the present invention provides an animal trap comprising a pair of arms, spring means between said arms urging said arms apart, an upper one of said arms being in the form of a ring and a lower one of said arms having trigger means secured thereto for holding said upper and lower arms together against the urging of said spring means when said trap is set and a flexible member extending around said ring to form a snare, and through a guide on said ring, said flexible member having its ends secured to said lower arm whereby operation of said trigger mechanism by an animal releases said upper arm for upward movement and causes said flexible member to be pulled through said guide thereby tightening said snare.

Figure 2:
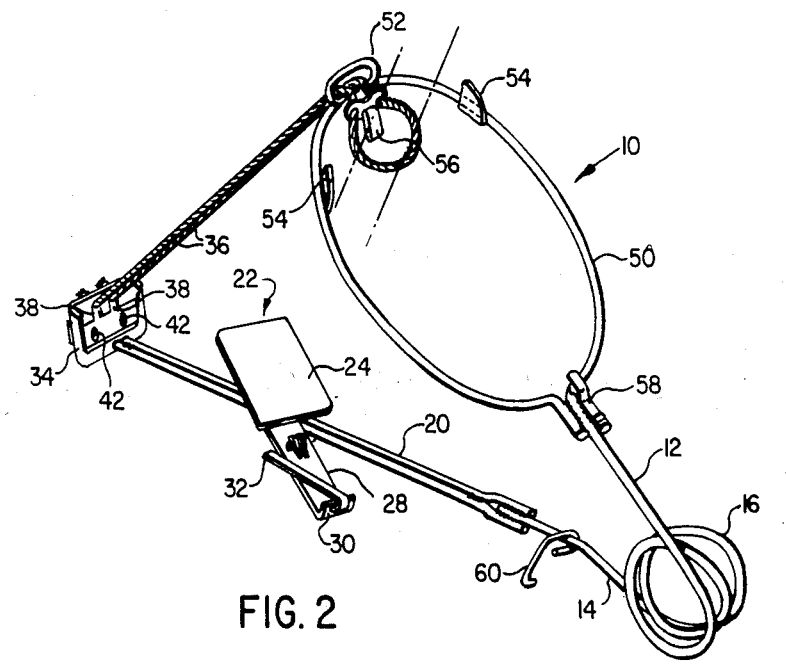

In the accompanying drawings, which illustrate an embodiment of the present invention, FIG. 1 is a perspective view of the trap in the "set" condition; and FIG. 2 is a perspective view of the trap in the "sprung" condition.

Referring now in detail to the drawings a snare type trap is shown generally at 10 and includes upper and lower spring arms 12 and 14 urged apart by an integrally formed coil spring 16. The lower arm 14 has an extension 20 secured thereto as by welding and is provided with conventional trigger means indicated generally at 22. A pan 24 is pivotally mounted on one end of a base 28 which is in turn welded to the lower arm extension 20 the other end of the base 28 has an upturned apertured flange 30. A trigger lever 32 has one end retained in the apertured flange and its other end is adapted to engage the underside of the pan in the "set" condition as shown in FIG. 1.

The outer end of the lower arm extension 20 has a bracket 34 mounted thereon for anchoring the ends of a steel cable or other suitable flexible means 36. Any suitable cable anchoring means could be used in place of the bracket 34. In this case downwardly opening slots 38 are provided in the bracket 34 to receive the ends of the cable 36. The cable ends are retained in the slots by a plate 40 attached to the bracket as by screws 42. The ends of the cable are prevented from pulling through the slots 38 by retaining means (not shown) crimped to their ends.

The upper arm 12 of the trap 10 has an extension in the form of a ring 50 of sufficient diameter to encircle the trigger and provide a support for a snare of the required size. The ring 50 has a guide or eyelet 52 through which the cable 36 extends. The cable 36 is retained on the ring 50 by opposed triangular guides 54 carried by the cable 36. The cable 36 is also received under a rod 58 welded to the arm 12.

The cable 36 also passes through two holes in a slidable member 56 which has a right angle bend and a depending portion 57 so that movement of the depending portion 57 due to the struggling of the animal causes the slidable member to bind on the cables thus keeping the snare closed.

To avoid injury while setting the trap it is considered advisable to provide a safety hook 60 which has one end bent around the lower arm 14 and one end capable of hooking onto the upper arm 12 when the trap is in the "set" condition shown in FIG. 1.

The trap 10 is "set" by urging the arm 12 and 14 together so that the hook 60 will engage the upper arm 12. The trigger lever 32 is then placed over the ring 50 so that its free end engages the underside of the pan 24. The safety hook 60 is disengaged only after the trap is in position.

As can be seen with reference to FIG. 2 when an animal presses downwardly on the pan 24 the trigger will be released from engagement with the pan 24 and the ring will move rapidly upwardly due to the force exerted by the spring 16. This causes the cable 36 to be drawn through the eyelet 52.

Movement of the ring 50 also causes the cable 36 to move out of engagement with the rod 58 and slide over the guides 54 until the snare has been drawn tight enough to encircle the leg of the animal.

It should be noted that because the ring 50 moves upwardly the snare formed by the cable 36 will be lifted up the leg or over any other part of the animal which is in the trap.

When the trap has been used, it is advisable to replace the cable 36 with a clean cable so that no scent of the trapped animal remains. The provision of a quick release fastener for the cable end is therefore desirable.

I claim:

1. An animal trap comprising a pair of arms, spring means between said arms urging said arms apart, an upper one of said arms being in the form of a ring and a lower one of said arms having trigger means secured thereto adjacent its mid portion, said trigger means including a lever having one end pivotally secured to said trap and extending over said upper arm to engage a pivotally mounted pan on said trap for holding said upper and lower arms together against the urging of said spring means when said trap is set and a flexible member extending around the periphery of said ring to entrain guides on said ring to form a snare, and extending through an eyelet on said ring, said flexible member having both its ends secured to said lower arm and its mid portion secured by a releaseable retaining element on said ring whereby operation of said trigger means by an animal releases said upper arm for upward movement thereby lifting said snare and causing said flexible member to be pulled through said eyelet thereby tightening said snare.

* * * * *